(12) United States Patent
Zander

(10) Patent No.: US 7,401,427 B2
(45) Date of Patent: Jul. 22, 2008

(54) BRACKET ASSEMBLY WITH DETACHABLE BODY FOR MOUNTING A FRONT LICENSE PLATE TO AN AUTOMOTIVE VEHICLE

(76) Inventor: Carl Alfred Zander, 24419 Hilliard Blvd., Fort Myers Beach, FL (US) 44145

( * ) Notice: Subject to any disclaimer, the term of this patent is extended or adjusted under 35 U.S.C. 154(b) by 0 days.

(21) Appl. No.: 11/257,721

(22) Filed: Oct. 25, 2005

(65) Prior Publication Data

US 2006/0090380 A1    May 4, 2006

Related U.S. Application Data

(60) Provisional application No. 60/624,078, filed on Nov. 1, 2004.

(51) Int. Cl.
  G09F 7/00 (2006.01)
  G09F 13/02 (2006.01)
  A47K 5/00 (2006.01)
  A47F 5/00 (2006.01)
  F16M 13/00 (2006.01)

(52) U.S. Cl. ............... 40/200; 40/209; 40/210; 40/204; 248/222.11; 248/300; 248/613; 248/610

(58) Field of Classification Search ............ 40/200, 40/209; D12/193; 248/309.1, 300, 176.1, 248/174, 126
See application file for complete search history.

(56) References Cited

U.S. PATENT DOCUMENTS 5,518,350 A * 5/1996 Kyprios ............... 411/343
5,813,640 A * 9/1998 Koch et al. ............. 248/222.11
6,796,060 B1 * 9/2004 Meester et al. ............ 40/210
2003/0196355 A1   10/2003 Castro
2004/0079007 A1   4/2004 Hashim et al.
2005/0017141 A1   1/2005 Glickman

* cited by examiner

Primary Examiner—Lesley D. Morris
Assistant Examiner—Syed A Islam

(57) ABSTRACT

A bracket for mounting a front license plate to an automotive vehicle that does not have an integrally designed and designated front license plate mounting location embodied as part of the front exterior of the vehicle that includes an associated integral license plate mounting mechanism, but does have existing, integral apertures in the body of the vehicle located behind and below the front grille of the vehicle which are used to secure a body panel to the vehicle. The bracket has a detachable body having a mounting surface adapted to receive a license plate, two arms that attach to the body and extend from the rear of the body. The two arms can attach to the body in either of two distinct positions, either with the top of the body facing up or with the top of the body facing down. The arms attach to the front of the vehicle body, without any modifications to the vehicle or drilling any holes into the vehicle, by means of fasteners that pass through apertures in the arms and are received by the existing, integral apertures located in the body of the vehicle behind and below the front grille of the vehicle.

4 Claims, 4 Drawing Sheets

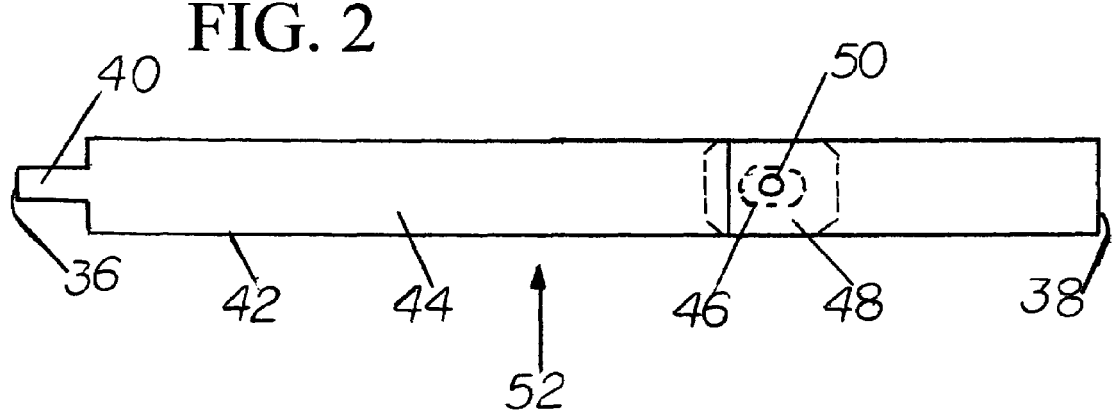
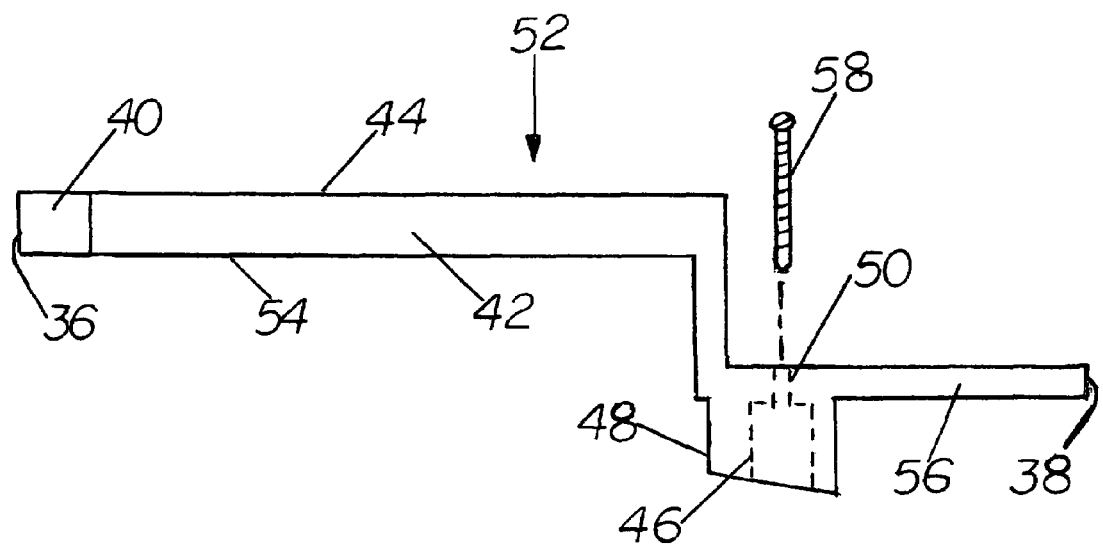

BRACKET ASSEMBLY WITH DETACHABLE BODY FOR MOUNTING A FRONT LICENSE PLATE TO AN AUTOMOTIVE VEHICLE

CROSS-REFERENCE TO RELATED APPLICATIONS

This application claims the benefit of and priority to provisional application, application No. 60/624,078, filed on Nov. 1, 2004 by the present inventor and titled Front License Plate Bracket For The Sixth Generation Chevrolet Corvette (C6).

FIELD OF THE INVENTION

The invention relates to a bracket for mounting a front license plate to an automotive vehicle, and more particularly, to an automotive vehicle that does not have an integrally designed and designated front license plate mounting location embodied as part of the front exterior of the vehicle that includes an associated integral license plate mounting mechanism.

BACKGROUND OF INVENTION

The majority of individual states of the United States require an automotive vehicle to have a license plate mounted to the front of the vehicle. Mounting a license plate to the front of a vehicle becomes difficult when the vehicle has low curved front profiles and large grille openings for the cooling system and no integrally designed and designated front license plate mounting location is embodied as part of the front exterior of the vehicle that includes an associated integral license plate mounting mechanism. In such cases, an add on accessory license plate mounting bracket is typically used which is typically molded from a composite material and attached to the front fascia of the vehicle using two way adhesive tape and/or screws. Attaching the bracket to the front fascia in this manner causes several problems. The bracket leaves abrasion marks in the paint of the front fascia that requires costly re-painting of the fascia if the bracket is removed such as in the case where the vehicle owner moves to another state that does not require a front license plate to be mounted on the front of a vehicle. If only two way adhesive tape is used to attach the bracket to the front fascia, the bracket can unexpectedly come off when high temperatures are experienced or when the vehicle is at high speed or when the vehicle is taken through a car wash, causing potentially very serious and costly damage to the vehicle. If screws are used to attach the bracket to the front fascia the fascia is seriously damaged as new non-original holes would have to be drilled in the fascia, which would require very costly repairs if the bracket were to be removed. Accordingly, it would be very desirable and beneficial to provide a front license plate mounting bracket that would be easily assembled and easily mounted to the vehicle using existing fastener locations somewhere on the vehicle; and that would not damage the front fascia of the vehicle or its painted surface; and that would have its main license mounting body, with the license plate attached, easily detached for purposes of taking the vehicle through a car wash; and that would provide a rigid and durable platform for the license plate that would not unexpectedly come off and cause damage to the vehicle.

SUMMARY OF THE INVENTION

The invention is a bracket for mounting a front license plate to an automotive vehicle that does not have an integrally designed and designated front license plate mounting location embodied as part of the front exterior of the vehicle that includes an associated existing, integral license plate mounting mechanism, but does have apertures in the body of the vehicle, located behind and below the front grille of the vehicle, that are used to secure a body panel to the vehicle and which could be used to attach other components to the vehicle, such as, a front license plate bracket assembly. An example of such a vehicle being the Sixth Generation Chevrolet Corvette™ automobile, manufactured by the Chevrolet Division of General Motors Corporation of Detroit, Mi., which was introduced and became available with the 2005 model year and is commonly referred to as the C6 Corvette™. The bracket provides for the mounting of the front license plate in such a manner so as not to cause damage to the front of the vehicle and without requiring any modifications to the vehicle or the drilling of any holes into the vehicle. The bracket includes a body and two identically configured arms. The body has a top, a bottom, a pair of sides and two arm slots through which the body is attached to the arms, either with the top of the body facing up or with the top of the body facing down, using set screws which allow the body to be attached and detached as desired in a quick and easy manner. Thus, the body has two distinct positions in which it can be attached to the arms. The front of the body has a planar mounting surface that provides for the attachment of a license plate. The arms which have a specific, uniquely configured physical structure are attached to the body by means of the arm slots in the body; one slot being disposed approximately one half the distance from the center of the body to the left side and the other slot being disposed approximately one half the distance from the center of the body to the right side; and the arms extend rearward through the grille opening of the vehicle and then extend downward so that the arm bases are received into the existing, integral body panel attachment screw recesses and apertures of the body panel of the vehicle; the body panel being located slightly below and behind the front grille opening and extends rearward on a horizontal plane from the grille opening. The arms are secured with screws that pass through an aperture in the arms and that are received into an existing, integral aperture that is in the recess of the body panel of the vehicle.

It is an advantage and a benefit of the present invention that no holes need to be drilled into the exterior surface of the front fascia of the vehicle to allow the mounting of the bracket and an associated license plate.

It is an advantage and a benefit of the present invention that the present bracket when mounted does not abrade the exterior paint of the front fascia of the vehicle or otherwise damage the front fascia of the vehicle.

It is an advantage and a benefit of the present invention that the present bracket will not unexpectedly come off under high temperature conditions or at high vehicle speeds.

It is an advantage and a benefit of the present invention that the present bracket has a body that can be easily attached and detached from its associated arms when it is desirable to do so, such as, where the vehicle on which the bracket is mounted is to be taken through a car wash, undergoing maintenance or used in competitive racing situations and that the body can be attached to the arms in two different positions, thus allowing the bracket and attached license plate to be varied in height distance from the ground, which based on variables in the environment within which the vehicle is to be operated can prevent damage to the vehicle.

It is an advantage and a benefit of the present invention that the present bracket when mounted to the vehicle is positioned substantially below the grille opening of the vehicle so that it does not impede the flow of air to the cooling system of the vehicle.

Additional advantages, benefits, objects and features of the present invention will become more apparent from the following specification of the preferred embodiments.

BRIEF DESCRIPTION OF THE DRAWINGS

The present invention will be more fully understood by reference to the specification of the preferred embodiment when read in conjunction with the accompanying drawings in which the reference numbers refer to like parts throughout the several views.

FIG. 2 is an orthogonal top side view of the arm of the bracket in accordance with the present invention.

FIG. 3 is an orthogonal left side view of the arm of the bracket in accordance with the present invention.

DETAILED DESCRIPTION OF THE PREFERRED EMBODIMENTS

Figure 5:
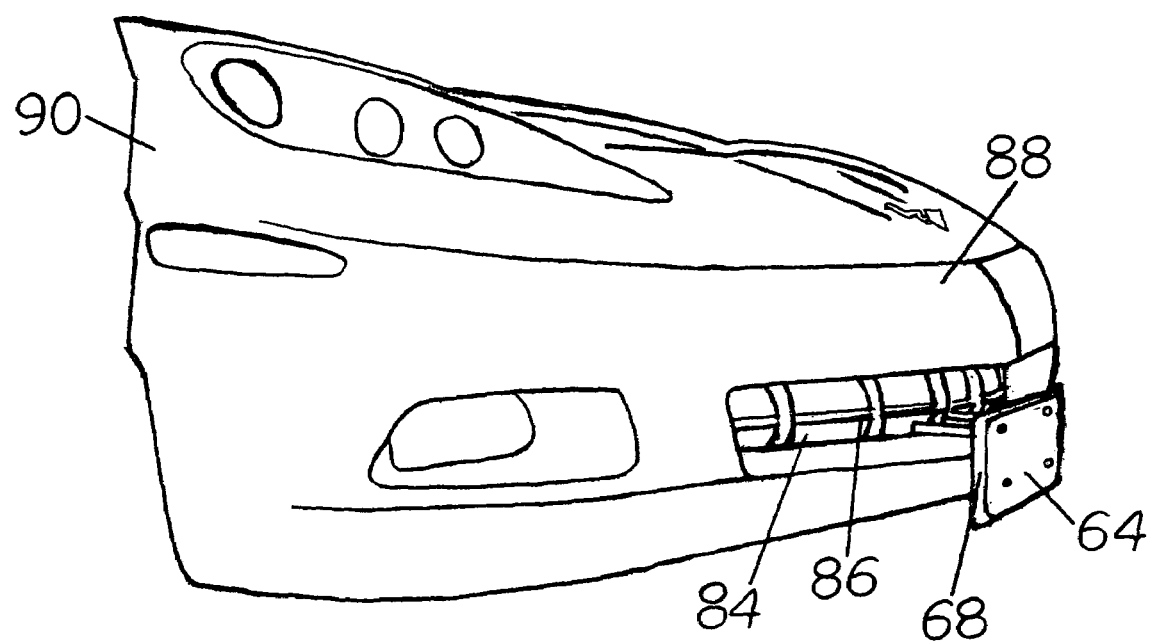
FIG. 5 is a perspective frontal view of the bracket with an attached license plate mounted in place to the front of a vehicle in accordance with the invention.

The bracket 68 with an attached license plate 64 mounted in place through the grille 86 and the grille opening 84 of the front fascia 88 of the front 90 of a vehicle is shown in FIG. 5.

Figure 1:
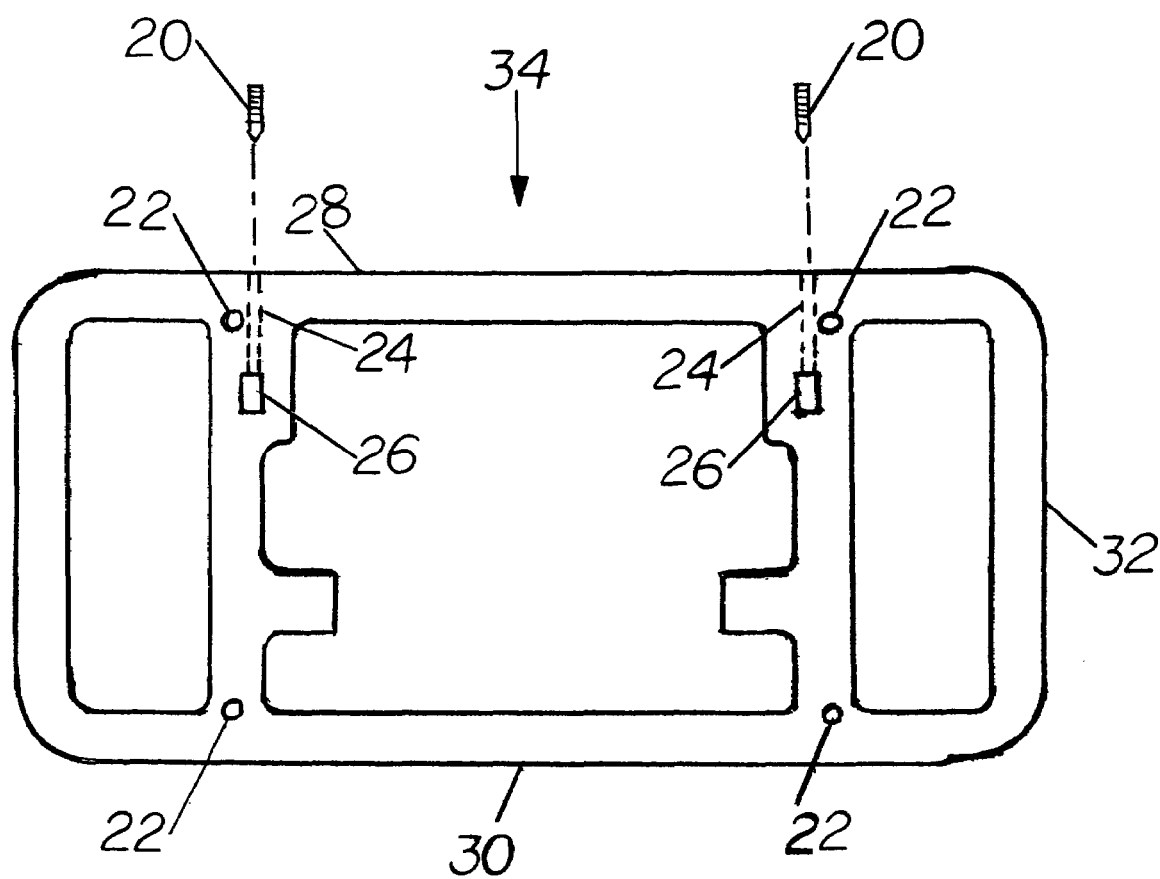
FIG. 1 is an orthogonal front side view of the body of the bracket in accordance with the present invention.
Figure 4:
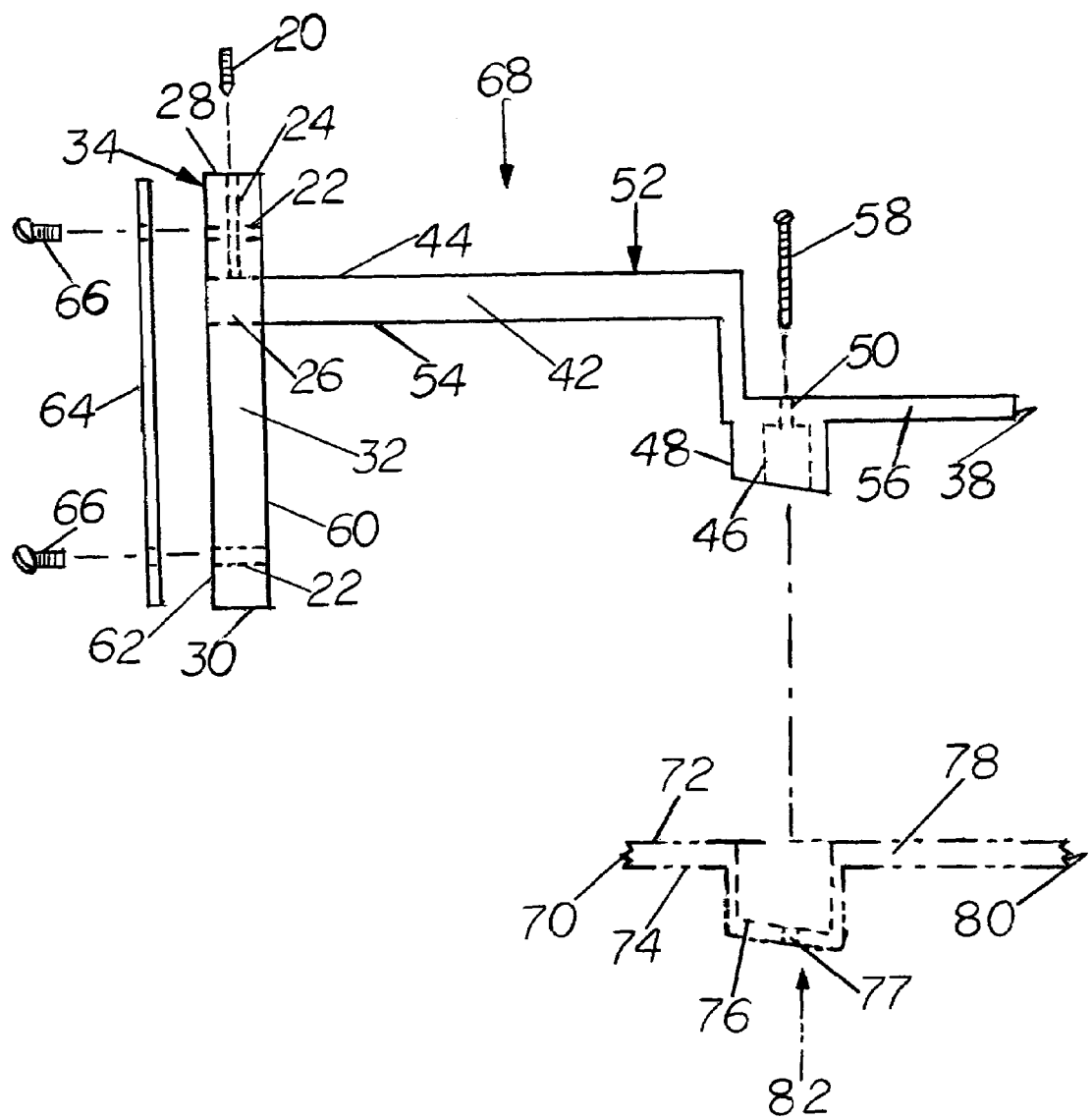
FIG. 4 is an orthogonal left side view of the bracket showing the interrelationship of the arm of the bracket attached to the body of the bracket and the relationship of the arm and arm fastener to the body panel of the vehicle and the recess in the body panel in accordance with the present invention.

As depicted in FIGS. 1 and 4 the bracket 68 includes a body 34 which has a top 28, a bottom 30, a front 62, a rear 60 and a pair of sides 32. The body 34 has a width between the top 28 and the bottom 30, which is equal to or greater than the width of the license plate 64. Likewise, the body 34 has a length between the two sides 32, which is equal to or greater than the length of the license plate 64. The license plate 64 is secured to the body 34 by four machine screws 66, which are received into four threaded apertures 22 of the body 34. The body 34 has two arm extension slots 26 which, receive the arm extension 40 of the arms 52 as shown in FIGS. 2 and 3. The body 34 is attached to the arms 52 by placing the arm extension 40 of the arms 52 into the arm extension slots 26 of the body 34. The arms 52 are then secured to the body 34 by two set screws 20, which are received into two threaded apertures 24 of the body 34 and which engage the arm extension 40 of the arms 52. Thus, the body 34, with a mounted license plate 64, is easily attached and detached from the arms 52 by simply either tightening or loosening each of the set screws 20 approximately one revolution.

As shown in FIGS. 2 and 3 and 4 the bracket 68 includes two identical arms 52. The arm 52 has a top 44, a bottom 54 a front 36, a rear 38 and a pair of sides 42. The arm 52 has a configuration such that it will project outward from behind and through the vehicle's grille opening 84 and grille 86, as shown in FIG. 5, to a distance just far enough so that the body 34 of the bracket 68 will just clear the front fascia 88, as shown in FIG. 5, of the vehicle. The arm 52 has a base 48, that is configured such that it will be received into the screw recess 76 of the body panel 82 of the vehicle, and a tab 56, both of which provide mounting contact surfaces for the arm 52. A sheet metal screw 58 passes through the embodied mounting aperture 50 of the arm 52 and is received into the aperture 77 of the recess 76 to secure the arm 52 to the body panel 82 of the vehicle. A clearance slot 46 is provided in the base 48 of the arm 52 to allow for angular adjustment of the sheet metal screw 58.

As best depicted in FIG. 4 the bracket 68 is attached to the vehicle by means of the arms 52 of the bracket 68. Each of the arms 52 is attached in the same manner. The rear 38 of the arm 52 is placed through the vehicle's grille opening 84 and grille 86, as shown in FIG. 5, so that the base 48 of the arm 52 aligns with the screw recess 76 of the vehicle body panel 82. The vehicle body panel 82 is typically a flat molded composite panel, with screw recesses 76, which has a top 72, a bottom 74, a front 70, a rear 80 and a pair of sides 78 and which is positioned horizontally just below and behind the grille opening 84 and grille 86, as shown in FIG. 5, of the vehicle and extends rearward and is secured to the vehicle with screws. The arms 52 are then placed onto the body panel 82 so that the base 48 of the arms 52 is received into the screw recesses 76 of the body panel 82 and that the tab 56 of the arms 52 contacts the top 78 of the body panel 82. The arms 52 are secured to the body panel 82 with sheet metal screws 58, which are received into the aperture 77 of the recesses 76 of the body panel 82.

While the bracket 68 as shown in FIG. 4 can be made from several different materials using several different manufacturing processes, the selected material and manufacturing process is 6061-T6 billet aluminum that is machined, using computer numerically controlled equipment, to produce the bracket 68. By using 6061-T6 aluminum the bracket 68 is light, durable, very rigid and can accept a variety of different finishes, such as, powder coating, anodizing and polishing.

Accordingly, from the description above it is apparent that my bracket, the present invention, has many advantages and benefits which include the following. First, the bracket is easily mounted to the vehicle using existing locations behind the grille opening of the vehicle, thus not requiring new holes to be drilled into the vehicle. Second, the body of the bracket with a mounted license plate can be easily removed from the vehicle in those situations where it is desirable to do so, such as, taking the vehicle through a car wash. Third, the bracket does not damage the painted surface of the vehicle or the front fascia of the vehicle to which the bracket is mounted. Forth, the bracket is light, durable and rigid. Fifth, the bracket will not come off unexpectedly in high temperature situations or when the vehicle is at high speeds. Sixth, the bracket will accept a variety of finishes, such as, powder coating, anodizing and polishing. Seventh, the bracket, when mounted to a vehicle, is positioned substantially below the grille opening of the vehicle so as not to impede the flow of air to the cooling system of the vehicle. These advantages and benefits of my invention should not be construed as limiting the scope of my invention, but merely presenting some of the many advantages and benefits of my invention.

Having disclosed my invention, many other modifications may be apparent to those skilled in the art to which it pertains without deviation from the spirit of the invention as defined by the scope of the appended claims.

I claim:

1. A bracket assembly for mounting a front license plate to an automotive vehicle, where said vehicle does not have an integrally designed and designated front license plate mounting location embodied in the front exterior of said vehicle that includes an integral means for mounting said license plate, where said vehicle does have existing, integral apertures in the body of said vehicle that are located behind and below the front grille of said vehicle, said bracket assembly comprising a detachable body having a front and a rear extending between a pair of sides, said front having a planar portion adapted for mounting said license plate thereto, said body having two attached arms that have a specific, uniquely configured physical structure so as to allow said arms to extend rearward from said rear of said body, passing through the front grille of said vehicle, to engage the existing, integral apertures in the body of said vehicle that are located behind and below the front grille of said vehicle, where said arms are secured by means of fasteners which pass through apertures in said arms to be received into said existing, integral apertures in the body of said vehicle that are located behind and below the front grille of said vehicle;

and where said body of said bracket assembly has a specific, uniquely configured physical structure, made up of in part of two attachment slots for said arms, one of said slots being disposed generally one half the distance from the center of said body to one of the sides and the other of said slots being generally disposed one half the distance from the center of said body to the other of said sides and where each of said slots is generally disposed two thirds of the distance from said bottom of said body to said top of said body, allowing said body to either be attached to said arms with the top of said body facing up or with the top of said body facing down.

2. The bracket of claim 1, wherein one of the said arms is disposed generally one half the distance from the center of the said body to one of the said sides and the other of the said arms is disposed generally one half the distance from the center of said body to the other of the said sides.

3. The bracket of claim 1, wherein each of the said arms extend from said body from a position generally two thirds of the distance from said bottom to said top.

4. The bracket of claim 1, wherein each of said arms have a specific, uniquely configured physical structure to allow said arms to extend rearward from said bracket body passing through the front grille opening of said vehicle engaging the existing, integral apertures in the body of said vehicle located behind and below the front grille opening of said vehicle and attaching to said vehicle by means of fasteners passing through apertures in said arms to be received into said existing, integral apertures of said vehicle body of said vehicle.

* * * * *

UNITED STATES PATENT AND TRADEMARK OFFICE
CERTIFICATE OF CORRECTION

PATENT NO. : 7,401,427 B2 Page 1 of 1
APPLICATION NO. : 11/257721
DATED : July 22, 2008
INVENTOR(S) : Carl Alfred Zander It is certified that error appears in the above-identified patent and that said Letters Patent is hereby corrected as shown below:

Title Page, Item (76) Inventors:
The city and state of the inventor's address, is in error; it reads:

FORT MYERS BEACH, FL

It should be change to:

WESTLAKE, OH

Signed and Sealed this

Seventh Day of October, 2008

JON W. DUDAS
*Director of the United States Patent and Trademark Office*